(12) United States Patent
DeLange et al.

(10) Patent No.: US 7,438,329 B2
(45) Date of Patent: Oct. 21, 2008

(54) METHODS AND CONNECTIONS FOR COUPLED PIPE

(75) Inventors: Richard W. DeLange, Kingwood, TX (US); Matthew Allen Hegler, Houston, TX (US); Andyle Gregory Bailey, Kingwood, TX (US)

(73) Assignee: V&M Atlas Bradford, LP, Houston, TX (US)

( * ) Notice: Subject to any disclaimer, the term of this patent is extended or adjusted under 35 U.S.C. 154(b) by 236 days.

(21) Appl. No.: 11/032,972

(22) Filed: Jan. 11, 2005

(65) Prior Publication Data
US 2006/0152000 A1 Jul. 13, 2006

(51) Int. Cl.
*F16L 25/00* (2006.01)
(52) U.S. Cl. .................................................. 285/333
(58) Field of Classification Search ................. 285/333, 285/334
See application file for complete search history.

(56) References Cited

U.S. PATENT DOCUMENTS

| | | | |
|---|---|---|---|
| 2,574,081 A | 11/1951 | Abegg | |
| 2,885,225 A * | 5/1959 | Rollins | 285/115 |
| 3,574,373 A * | 4/1971 | Le Derf et al. | 403/296 |
| 3,854,760 A * | 12/1974 | Duret | 285/334 |
| 4,373,750 A | 2/1983 | Mantelle et al. | |
| 4,494,777 A | 1/1985 | Duret | |
| 4,508,375 A * | 4/1985 | Patterson et al. | 285/334 |
| 4,600,225 A | 7/1986 | Blose | |
| 4,673,201 A * | 6/1987 | Dearden et al. | 285/333 |
| 4,732,416 A | 3/1988 | Dearden et al. | |
| 4,762,344 A * | 8/1988 | Perkins et al. | 285/148.19 |
| 5,360,239 A | 11/1994 | Klementich | |
| 5,474,334 A * | 12/1995 | Eppink | 285/184 |
| 5,769,466 A * | 6/1998 | Noel et al. | 285/332 |
| 5,782,503 A * | 7/1998 | Noel et al. | 285/94 |
| 5,906,399 A * | 5/1999 | Noel | 285/55 |
| 6,050,610 A | 4/2000 | Enderle et al. | |
| 6,406,070 B1 | 6/2002 | DeLange et al. | |
| 6,817,633 B2 * | 11/2004 | Brill et al. | 285/333 |
| 6,893,057 B2 * | 5/2005 | Evans | 285/334 |

OTHER PUBLICATIONS

DinoVam specifications, http://www.vampts.com/DinoVAMPhoto.htm (5 pages)—Jul. 23, 1998.
Seal-Lock Boss specifications, 2002, (3 pages).

* cited by examiner

*Primary Examiner*—David E Bochna
(74) *Attorney, Agent, or Firm*—Browning Bushman P.C.

(57) ABSTRACT

A threaded and coupled connector with tapered threads having equivalent heights (same height on pin and box threads), negative load flanks, biased tapered thread forms with a torque shoulder formed by pin noses that abut at a central point within a coupling constructed from standard coupling stock. The connection design meets the internal/external pressure performance requirements of industry standards with capabilities equal to or exceeding those of "premium" connections, with a coupling constructed from thin walled coupling stock.

16 Claims, 4 Drawing Sheets

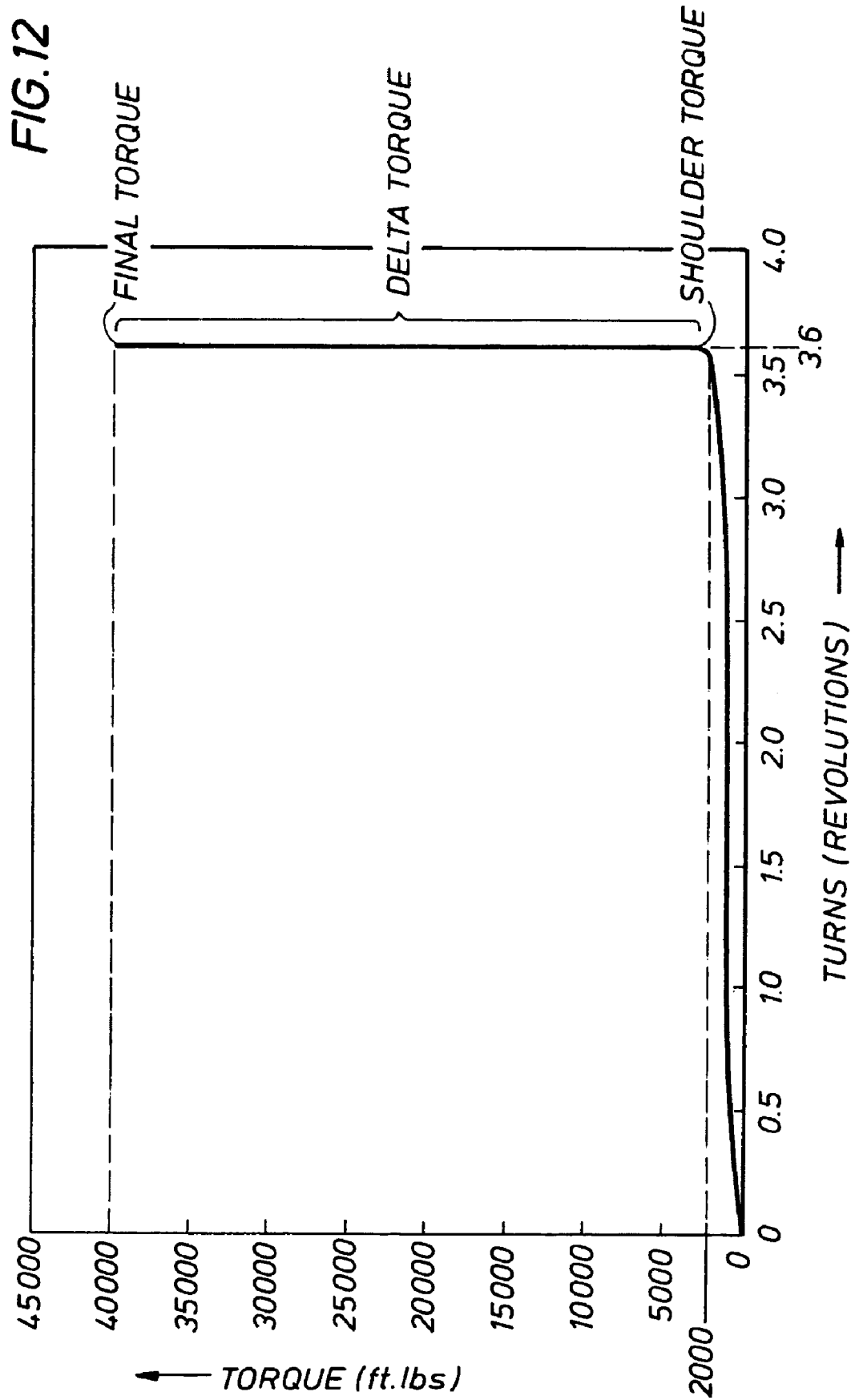

METHODS AND CONNECTIONS FOR COUPLED PIPE

BACKGROUND OF THE INVENTION

1. Field of the Invention

The present invention relates to methods and connections for securing together the ends of threaded tubular bodies to produce a structurally strong and leak resistant joinder of such tubular bodies. More specifically, the present invention relates to a threaded coupling and pin assembly, and associated method, for securing together the threaded ends of tubular pipe bodies such that the engaged pin and coupling threads will form a secure mechanical engagement and a high-pressure, leak resistant thread seal.

2. Background Setting of the Invention

Tubular pipe bodies used in the construction of oil and gas wells are typically secured together at their ends by threaded connectors that employ a thread and seal design intended to withstand the structural forces acting between the threaded components as well as to prevent the flow of high-pressure well fluids through the engaged threads of the connection. In many of the thread designs used to secure the pipe ends together, the threads function both as mechanical engagement structures and as pressure sealing structures.

Connections in which sealing is not an objective of the thread design often achieve sealing with supplementary seal rings and/or metal-to-metal seals that are constructed as integral components of the connection. Connections incorporating these seal enhancing features are often referred to as "premium connections". Premium connection designs can require the use of couplings with coupling walls thicker than those of the coupling stock used to make couplings meeting specifications of the American Petroleum Institute (API). These heavier walled couplings are required to provide torque shoulders and to maintain a high coupling rigidity that aides in accommodating stress in the coupling during extreme internal/external pressures or tensile/compressive loads. When conditions permit, it is usually desirable to avoid as many as possible of the added features of these premium connectors, such as seal rings, metal-to-metal seals and heavy wall coupling stock because of the added cost and complexity associated with their use.

The coupling stock having dimensions and specifications such as from which API couplings are made is herein referred to as "standard coupling stock". Standard coupling stock typically has a thinner wall construction and is more readily available than that required for many premium connections. A connection that may be built using standard coupling stock is less expensive to manufacture than one requiring coupling stock with a wall thickness greater than that found in standard coupling stock. Even within the range of standard coupling stock, the cost savings may be maximized by using the thinnest wall standard coupling stock possible because of the difference in steel content.

The following table lists the specifications for "standard coupling stock" used in the construction of API couplings for typical pipe sizes:

Standard Coupling Stock for Casing

| Nominal OD, Inches | | | | | |
|---|---|---|---|---|---|
| Casing | Coupling Stock | Thread Type | Nom. Wall (Inches) | Wt/ft (lbs) | FBS |
| 4½ | 5.000 | Short | .466 | 22.59 | 4.185 |
|  |  | Long | .479 | 23.15 | 4.162 |
|  |  | Buttress | .443 | 21.58 | 4.225 |
| 5 | 5.563 | Short | .507 | 27.40 | 4.675 |
|  |  | Long | .529 | 28.47 | 4.638 |
|  |  | Buttress | .483 | 26.23 | 4.718 |
| 5½ | 6.050 | Short | .500 | 29.66 | 5.175 |
|  |  | Long | .526 | 31.06 | 5.130 |
|  |  | Buttress | .477 | 28.42 | 5.215 |
| 6⅝ | 7.390 | Short | .635 | 45.85 | 6.278 |
|  |  | Long | .662 | 47.61 | 6.232 |
|  |  | Buttress | .607 | 44.01 | 6.328 |
| 7 | 7.656 | Short | .573 | 43.39 | 6.653 |
|  |  | Long | .603 | 45.46 | 6.600 |
|  |  | Buttress | .552 | 41.92 | 6.690 |
| 7⅝ | 8.500 | Short | .706 | 58.82 | 7.265 |
|  |  | Long | .735 | 61.01 | 7.214 |
|  |  | Buttress | .683 | 57.07 | 7.305 |
| 8⅝ | 9.625 | Short | .781 | 73.84 | 8.258 |
|  |  | Long | .826 | 77.69 | 8.180 |
|  |  | Buttress | .760 | 72.02 | 8.295 |
| 9⅝ | 10.625 | Short | .781 | 82.19 | 9.258 |
|  |  | Long | .829 | 86.81 | 9.175 |
|  |  | Buttress | .760 | 80.15 | 9.295 |
| 10¾ | 11.750 | Short | .786 | 92.12 | 10.375 |
|  |  | Buttress | .759 | 89.18 | 10.422 |
| 11¾ | 12.750 | Short | .786 | 100.53 | 11.375 |
|  |  | Buttress | .763 | 97.77 | 11.415 |
| 13⅜ | 14.375 | Short | .786 | 114.18 | 13.000 |
|  |  | Buttress | .760 | 110.61 | 13.045 |
| 16 | 17.000 | Short | .803 | 139.04 | 15.594 |
|  |  | Buttress | .833 | 143.96 | 15.543 |
| 18⅝ | 20.000 | Short | 1.018 | 206.57 | 18.219 |
|  |  | Buttress | 1.048 | 212.32 | 18.166 |
| 20 | 21.000 | Short | .803 | 173.37 | 19.594 |
|  |  | Buttress | .834 | 179.79 | 19.541 |

In addition to being more costly, thick wall coupling designs reduce the central clearance through the connector. The nominal outside diameter of all coupling stock is the same for any given pipe size to be used in a conventional string design. Coupling strength may be obtained by increasing the wall thickness toward the center of the coupling, however such strengthening results in reducing the clearance through the coupling. Reduced coupling clearance is usually associated with an undesirable reduction in the clearance through the pipe engaged in the coupling.

Recently, the industry has required that threaded pipe connections meet certain new performance and testing criteria. As a part of this requirement, the connectors are subjected to rigorous testing for qualification to new industry standards. One such industry standard is the International Organization for Standardization (ISO) 13679 specification. ISO 13679 is an international specification outlining the procedures to be used in testing casing and tubing connections for the oil and natural gas industries. This specification was developed to more realistically validate performance parameters by testing extreme service conditions and loads that the tubing and casing connections see during use. The ISO 13679 specification results, in part, from a determination that design changes in existing connections may be required to attain useful service load envelopes for connectors. One aspect of the specification requires that the connection be assembled in such a way that at the final make-up, there is a preloading of the connector axially. It has been found that this axial preload can be advantageous in improving pressure capacity as the axial load on the connector goes from tension to compression.

The torque force applying the pre-load is frequently referred to as a "delta torque". Delta torque may be defined as that part of the final make-up torque that is induced into axially interfering components of the pin and box connection after resolving the radial thread interference occurring during the make-up. FIG. 12 of the drawings illustrates a Torque (T) vs. Turns (TN) chart defining shouldering torque (ST), delta torque (DT) and final torque (FT). Torque T is plotted on the vertical axis and the amount of pin turning TN relative to the coupling is plotted on the horizontal axis. The maximum radial interference experienced in the make-up before engagement of shoulders is commonly referred to as the shouldering torque ST. The lower bound of the delta torque, i.e. the shoulder torque, is attributable to the thread interference that occurs before the connection is stopped from rotating because of the engagement of axially interfering connection components in the pin and box. The upper bound of delta torque, or final torque, is the total torque applied to the connection during make-up. It will be understood that the magnitude of the pre-load force is a function of the magnitude of the delta torque. Increasing delta torque may be achieved by lowering the shoulder torque and/or increasing the final torque of a connection.

In general, preloading a connection requires that the connection be assembled with a high torque force stored in the connection. The upper boundary on torque is usually determined by the capacity of the hydraulic power tong that is used to apply the torque to the connection at the well site. The available make-up torque at the well site must be distributed to achieve an optimum balance of radial and axial forces within the connection. This requires imposing radial interference levels in the connection that are sufficient to energize the threads for sealing while conserving tong torque capacity for applying the required final torque to achieve a desired axial preload.

When axial compression loads are applied to the connection, either during testing or during use in the well, it is possible that the axial preload force will be exceeded. When this occurs, a cascading "micro-movement" effect occurs down the threads as load flanks are disengaged and stab flank clearances are reduced and eventually engaged. This micro-movement disturbs the thread compound in conventional thread designs and can lead to the initiation of leaks. Increasing the final torque is not necessarily an economical option for increasing the preload in an attempt to overcome this susceptibility to leakage. In addition to the fact that the rig tongs may often lack capacity to add sufficient final torque, very high torque values applied to the pipe increase the opportunity to damage the pipe body and/or the pipe threads.

The prior art has suggested a variety of different assembly methods and thread designs in an effort to prevent leakage in connectors that are subjected to high axial tension and compressive loads. In addition to preloading the connection, the prior art has suggested specific connection thread configurations for improving the seal between engaged threaded connectors. The prior art specifically teaches thread designs that employ thread seals for sealing internal and external pressure in an environment subjected to axial tension and compression loads. Certain of these prior art designs feature negative load flank threads, diametrical (radial) interference levels, torque shoulders and special thread clearances to enhance a thread seal. Biased tapers between the pin and box to aid in the seal created by the thread compound-to-thread profile interface are also features of prior art connections. Designs incorporating a torque shoulder that is achieve by abutting the pin noses of the two pipe joints engaged within a coupling have also been proposed. Some of the prior art designs have also combined abutting pin nose shoulders with one or more of the other seal enhancing features known in the prior art designs. The benefits of constructing a connection within the limits of readily available and economic American Petroleum Institute (API) coupling stock are also well recognized by prior art designers. None of the prior art, however, teaches or suggests an easily manufactured, economical connection that provides a satisfactory thread seal in conventional coupling stock within an environment subjected to high axial stress loads with final make-up torques that are within the working capacity of the power tongs commonly used to assemble connections at the well site.

BRIEF SUMMARY OF MAJOR INVENTIVE FEATURES

The present invention successfully incorporates the benefits of individual prior art design features in a new assembly within a single connection to achieve an economic, effective high-pressure thread seal that is inexpensively manufactured using standard coupling stock and assembled with final make-up torque values within the capacity of rig site tongs and having the ability to function leak free within testing or working environments in which the connection is exposed to high axial stress loads. These beneficial results are achieved without the benefit of a metal-to-metal seal or a supplementary O-ring seal.

A connection of the present invention may have as much as three times the delta torque of prior art designs due in part to a lower shoulder torque and in part to a design permitting a higher final torque.

The preferred embodiment of the present invention is a tapered, threaded and coupled connector with an equivalent height (same height on pin and box threads), negative load flank, biased tapered thread form with abutting pins made-up within a coupling constructed from standard coupling stock. The design of the present invention meets the internal/external pressure performance requirements of industry standards with capabilities equal to or exceeding those of "premium" connections, with a coupling constructed from standard coupling stock.

During the initial portion of the make-up of a shouldering connection, the torque energy is consumed in friction losses and in deflecting connection parts in the radial direction. The torque energy consumed by these friction losses and radial deflections reduces the final torque force available for preloading the connector axially. The design of the present invention balances radial interference and preload torque to maintain sealability at final torques that are within the capacity of conventional field make-up equipment. This objective is attained in part with a thread design that reduces the torque required to attain shoulder contact.

The design of the present invention prevents leakage caused by micro-movement within a coupling constructed of standard coupling stock.

The coupling design of the present invention decreases the shouldering torque, which permits a larger delta torque at final make-up without necessarily requiring a higher final make-up torque.

The design of the present invention prevents leakage caused by micro-movement with a thread design that permits applying higher final torques, within the capacity of existing pipe make-up equipment at the well site, in an assembly constructed with standard coupling stock.

The beneficial results of the present invention are obtained, in part, from combining coupling rigidity, optimized pin nose thickness and large delta torques without the need for high final torque values that can exceed the capacity of the field make-up equipment. The wall at the center of the standard coupling stock is maintained at or near its nominal thickness to optimize radial stability with the first engaged pin end threads at the full make-up position to thereby improve the sealing capacity of the connection. All of these results are achieved in a connection using standard coupling stock.

The present invention relates, in part, to a coupling and pin thread configuration, and associated method, for securing together the threaded ends of tubular pipe bodies such that the engaged pin and coupling threads will form a secure mechanical engagement and a high-pressure resistant thread seal and wherein such seal is achieved with standard coupling stock materials and without necessity for the use of a metal-to-metal seal.

In the preferred form of the invention, the API coupling stock for buttress casing pipe threads is internally machined with tapered threads that extend to the center of the coupling from each coupling end. The pin ends of the tube joints to be secured by the coupling are machined with external threads that make-up with the coupling threads such that the pin end faces engage at the center of the coupling to provide mutual torque shoulders before the final make-up torque is applied to the connection. The preferred embodiment of the design of the present invention maximizes the available coupling thickness (at the center of the coupling) by running out the box threads completely down to the internal diameter of standard API Buttress coupling stock. This feature not only aids in coupling rigidity but also provides a significant cost savings attributable to the ease and simplicity of machining the connection. The use of the thinnest walled standard coupling stock (buttress) reduces cost and permits the formation of the thickest pin wall ends for shouldering while maintaining the largest possible central opening through the connected pins and coupling of the connector.

In a preferred form of the invention, sealing between the pin and the coupling is enhanced by constructing the nominal thread height of the pin and box threads to substantially the same height and by constructing the stab flank clearance to the minimum possible, within manufacturing tolerances, that produces non-galling interference between the thread stab flanks during make-up. A negative load flank thread geometry is provided in the mating pin and coupling threads to impose radially compressive forces between the pins and coupling during the latter part of the make-up. The application of torque to the connection after engagement of the pin faces effects an axial preload at the final make-up torque that prevents axial separation of the engaged pin and box threads when the connection is placed in tension.

In a preferred form of the invention, the external threads of each pin are removed from a portion of the pin adjacent the pin face to form a pin nose. The non-threaded pin noses absorb and store compressive, preload forces applied during the torquing together of the two pin ends within the coupling. The ratio of the pin nose wall thickness to the pin nose length is maintained as high as possible to permit maximum axial interference during the application of torque to the connection.

During the compressive torquing that produces the preload, the absence of engaged external threads on the pin noses enhances the magnitude of axial compressive, spring-back forces preserved in the axially compressed pin ends. While optimization of force storage within the pin noses during the preload torquing might also be achieved by removal of a portion of the central coupling threads rather than by removal of the pin nose threads, the machining process for removing pin nose threads achieves the same effect and is simpler and less expensive than that required for removing the central coupling threads, further contributing to the ease of manufacture and reduced cost of the connection.

Removal of the pin nose threads rather than the central coupling threads also ensures that the coupling wall thickness at the center of the coupling is maintained substantially the same as the nominal wall thickness of standard coupling stock, thereby maximizing the remaining wall thickness at the center of the coupling to retain maximum resistance to radial strain resulting from applied forces and pressures when the pipe string is being tested or used. It will be appreciated that, if desired, the internal central area of the coupling may also be left unthreaded in the area that is to over lap the reduced diameter pin noses to thereby prevent engagement of the pin noses with the coupling while retaining the maximum wall volume at the center of the standard coupling stock blank.

Creation of mutual torque shoulders by the engagement of abutting pin nose end faces eliminates the need for forming a torque shoulder on the internal surface of the coupling, a design which would require a thicker, non-standard coupling stock to maintain desired capacities. The abutting pin nose faces, which define the torque shoulder area, are maximized by selecting the optimum pin-nose-length to torque-shoulder area ratio consistent with the thread taper, thread interference and coupling thickness. Maximizing the pin nose wall thickness also maximizes the allowable torque for preloading the connection. The pin nose thickness is limited by factors such as thread taper, interference and coupling thickness. In determining adequate pin nose thickness, upper and lower limits on the pin-nose length to torque-shoulder area ratio have been determined to optimize performance of the connection of the present invention. The optimized ratio is a measure of pin nose stiffness to allowable final torque. The ratio decreases with increasing wall thickness within a design outside diameter range. Use of the relatively thin wall buttress standard coupling stock permits maximizing the pin nose thickness.

A preferred lower limit design for the pin-nose-length/torque shoulder area ratio of the present invention is 0.025. With the pin nose length being set as two times the thread lead, heavier walled designs would require longer pin nose lengths to maintain an adequate ratio for preload during make-up. The preferred upper limit for the pin-nose-length/torque shoulder area ratio of the present invention is 0.35. The minimum pin nose thickness of the present invention is thus limited as required to provide sufficient preload during make-up.

The design of the present invention provides nearly three times the delta torque of conventional connections, due in part to a thread design that permits a lower shoulder torque and higher final torque as compared with some conventional connections.

The thread dimensions, configuration and pin-face preloading cooperate to form a substantially rigid, non-moving connection that does not disturb the seal formed between the pipe dope and threads to thus maintain a seal between the pins and the coupling without need for a metal-to-metal seal, despite changes in axial loading of the connection experienced during testing or actual usage.

The foregoing features, objectives and advantages of the present invention, as well as others, will be more readily understood and appreciated by reference to the following drawings, specification and claims.

BRIEF DESCRIPTION OF THE DRAWINGS

FIG. 12 is a graphical representation of the torque verses turns in the make-up of a shouldering connection illustrating shouldering torque, delta torque and final torque.

DESCRIPTION OF THE ILLUSTRATED EMBODIMENTS

Figure 1:
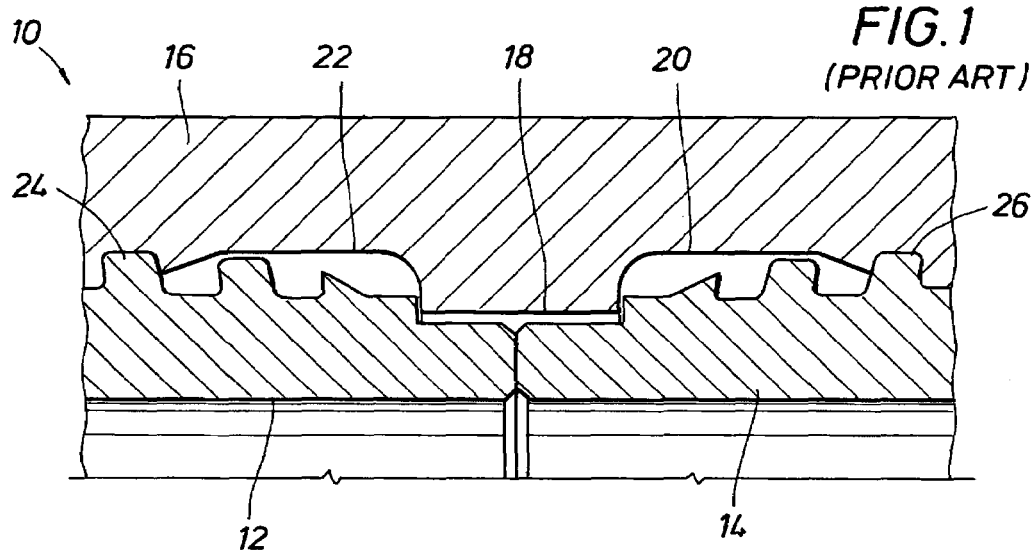
FIG. 1 is a vertical cross sectional view, partially broken away, illustrating a prior art connection of pins made-up into a cutaway-center coupling with the pins having pin-to-pin nose shouldering.

FIG. 1 illustrates a prior art connector, indicated generally at 10, in which pins 12 and 14 are connected within a coupling 16. The two pins 12 and 14 engage at noses formed at their axial ends to form mutual torque shoulders. The central portion of the coupling 16 includes a centrally enlarged area 18 that functions as a mill make-up arrester and provides coupling strength at the center of the coupling. Recessed areas 20 and 22 on either axial side of the enlarged area 18 are devoid of threads such that the pin noses of the pins 12 and 14 are free to be axially stressed without transferring axial stress to the surrounding coupling 16. Threads 24 on the pin 12 and 26 on the pin 14 engage the internal coupling threads to provide a mechanical engagement and thread seal. The threads 24 and 26 are provided with negative load flanks to impart radially compressive forces between the pin threads and the coupling.

The design of the prior art connection of FIG. 1 requires that the central wall area 18 of the coupling 16 be enlarged radially to accommodate the mill-make-up arrester while being reduced radially to form the recessed areas 20 and 22. To the extent that the enlarged area 18 requires coupling stock having a wall thickness greater than that found in standard coupling stock, the cost of the design is increased. Moreover, machining the recesses 20 and 22 into the coupling wall to prevent transfer of axial stresses between the pin and coupling in the pin nose area adds to the connection's manufacturing costs and also reduces the coupling wall strength. To the extent that the coupling strength is compromised, the connection stiffness is reduced and the likelihood of leakage caused by micro-movement between the pins and coupling is increased.

Figure 2:
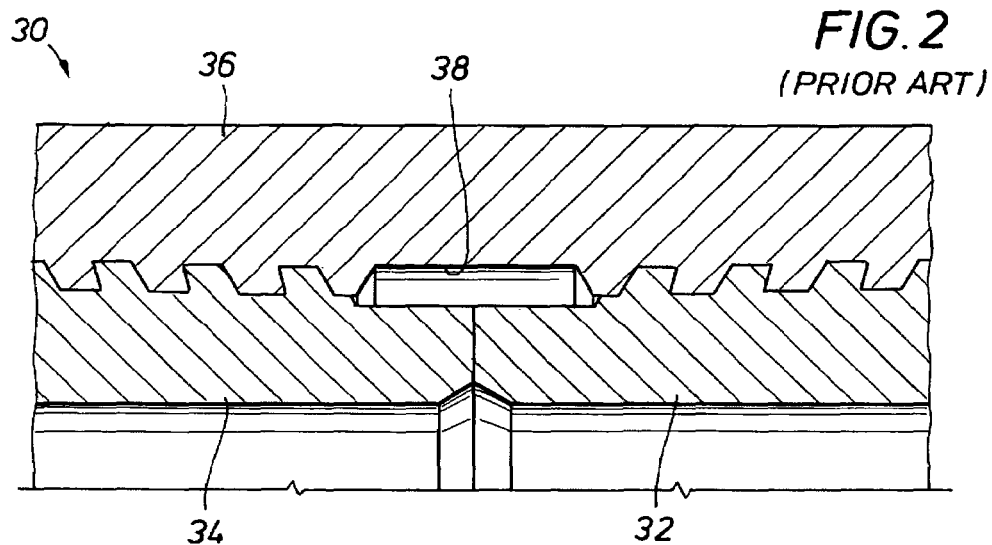
FIG. 2 is a cross sectional view, partially broken away, illustrating a prior art connection of pins made-up into a cutaway-center coupling with the pins having pin-to-pin nose shouldering.

FIG. 2 illustrates another prior art design, indicated generally at 30, in which pins 32 and 34 abut their pin nose faces within a coupling 36. The coupling 36 has a centrally recessed area 38 that prevents contact between the pin noses and the coupling to isolate axial pin nose forces from the surrounding coupling. The threads connecting the pins and the coupling are provided with negative load flanks. The design of FIG. 2 requires that the central area of the coupling 36 be machined internally to provide the recessed area 38. This machining reduces the available coupling wall and reduces the ultimate strength of the connection. Reduction in the coupling strength also reduces the connection stiffness, which enhances the possibility of micro-movement during axial loading, which in turn increases the likelihood of connection leakage.

Figure 3:
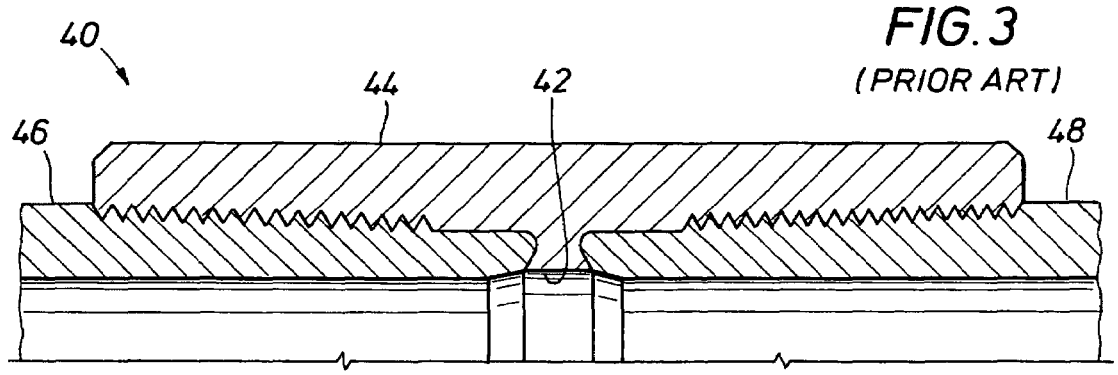
FIG. 3 is a cross sectional view illustrating a prior art connection of pins made-up into an enlarged-center coupling with the pin noses engaging an internal coupling torque shoulder.

FIG. 3 is a prior art connection, indicated generally at 40, in which an internal torque shoulder is provided by a radial internal wall projection 42 formed at the central area of a coupling 44. Two pins 46 and 48 are illustrated engaged within the coupling with the noses of the pins shouldering against the internal radial projection 42. The manufacture of the coupling 42 requires a coupling stock having a minimum wall thickness equal to that of the projection 42. In order to achieve sufficient structural strength, the coupling wall must typically be greater than that found in standard coupling stock. The requirement for thicker wall coupling stock increases the cost of fabricating the connection as compared with that of a connection that may use standard coupling stock.

Figure 4:
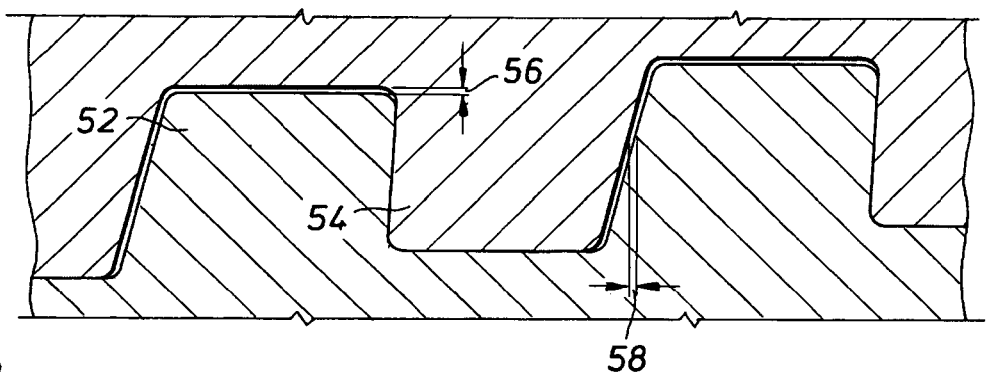
FIG. 4 is an enlarged cross sectional view illustrating details in the engagement of pin and box threads in a prior art connection.

FIG. 4 illustrates the engaged threads of a prior art pin and coupling design indicated generally at 50. The prior art thread design 50 typically includes pin threads 52 that are shorter than the box threads 54 with the result that a box root/pin crest gap 56 is present between the pin and box at the final make-up position. In this prior art design, the root-crest thread gap is approximately 0.002 in. for most sizes of pipe. A stab flank gap 58 of 0.003 in. also exists in this prior art design when the connection is at its final make-up position. The gap 56 extends as a helical passage throughout the length of the connection 50. The gap is sealed with a suitable pipe lubricant to prevent leakage. The pipe lubricant in the gap 56 is subject to the disturbance of micro-movements when the connection is exposed to changes in axial loading. As noted previously, the occurrence of micro-movement in the connection can result in connection leakage.

Figure 5:
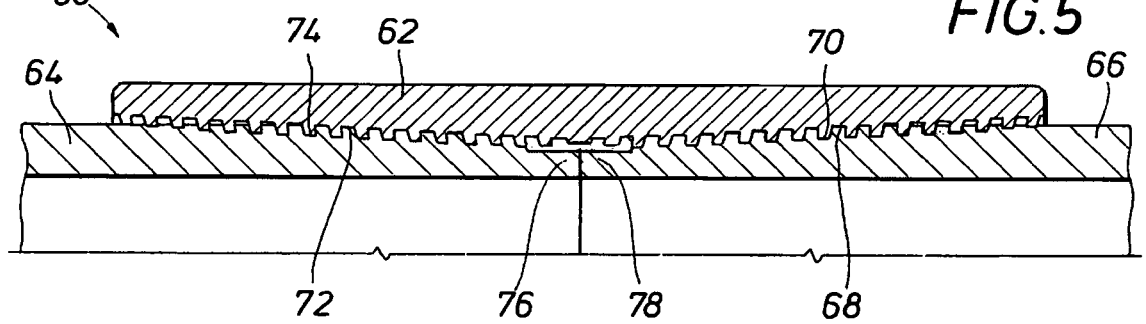
FIG. 5 is a quarter sectional view illustrating a connection of the present invention with a coupling constructed from standard coupling-stock material with the pins having pin-to-pin nose shouldering.

FIG. 5 illustrates a tapered, threaded and coupled connector of the present invention, indicated generally at 60, with a biased tapered thread form that includes a coupling 62 and two pipe pins 64 and 66. Tapered threads 68 on the external surface of the pin 66 are engaged with correspondingly tapered threads 70 formed internally at one end of the coupling 62. Similarly, threads 72 on the external surface of the pin 64 are engaged with threads 74 formed internally at the opposite end of the coupling 62. The threaded sections of the connection 60 comprise a biased tapered thread form. The threads 68, 70 and 72, 74 are provided with negative load flanks. The pin 64 has a pin nose 76 and the pin 66 has a pin nose 78. The tube pin noses 76 and 78 engage each other at the central portion of the coupling 62 to provide mutual torque shoulders. The coupling 62 is constructed from standard coupling stock for a buttress connection.

Figure 6:
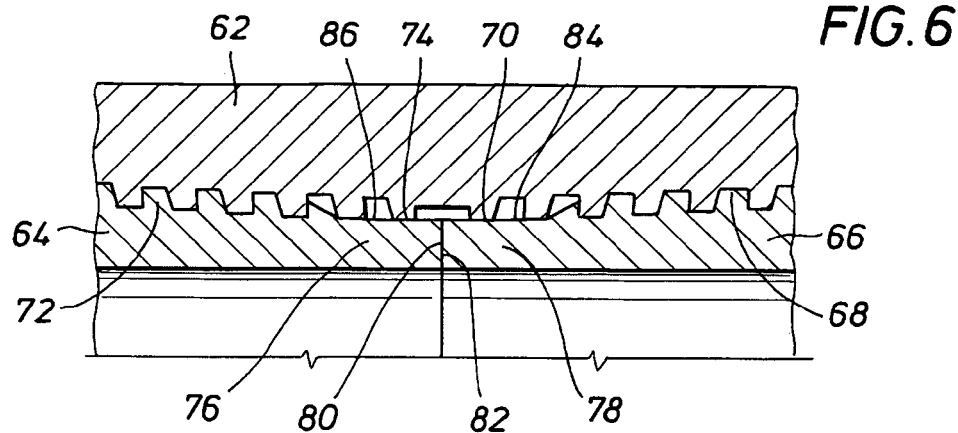
FIG. 6 is an enlarged cross sectional view illustrating details in the pin-to-pin nose engagement of the connector of the present invention at the central section of the coupling.

FIG. 6 illustrates details in the mutual annular pin nose torque shoulders formed at the central area of the connection of the present invention. The pin nose 78 is provided with an annular pin nose 82 and the pin nose 76 is provided with an annular pin nose face 80. The external area adjacent the axial end of the pin nose 78 is provided with an external cylindrical area 84 that is free of threads. A similar cylindrical area at 86 is formed on the external cylindrical area adjacent the axial end of the pin nose 76. The threads 70 of the coupling 62 are illustrated overlying the cylindrical area 84, free of engagement with threads of the pin 66. Similarly, the threads 74 of the coupling 62 are illustrated overlying the cylindrical area 86, free of engagement with the threads of the pin 64. The pin nose faces 80 and 82 form annular, mutual torque shoulder areas.

Figure 7:
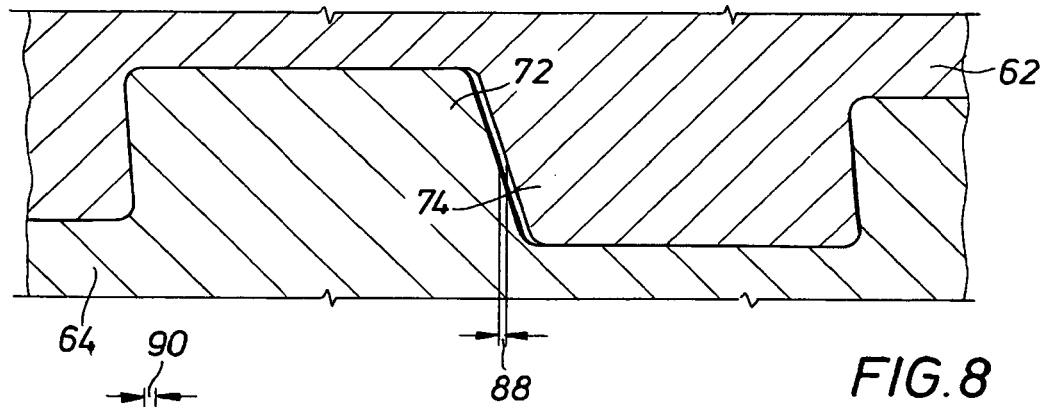
FIG. 7 is an enlarged sectional view illustrating stab flank clearance between the threads of the connection of the present invention before compressive loading of the connection.

FIG. 7 illustrates details in the thread construction of the connection of the present invention. The engaged pin and box threads of the present invention are of equivalent height such that no gap exists between the root and crest of the engaged threads when the connection is made-up to final torque. The threads of the connection in FIG. 7 are depicted as they would appear with the connection being subjected to a torque preload or an externally imposed tension load. Under tension loading, a gap 88 exists between the stab flanks of the threaded connection. In a preferred embodiment of the present invention, the gap 88 will be approximately 0.003 in. in axial length.

Figure 8:
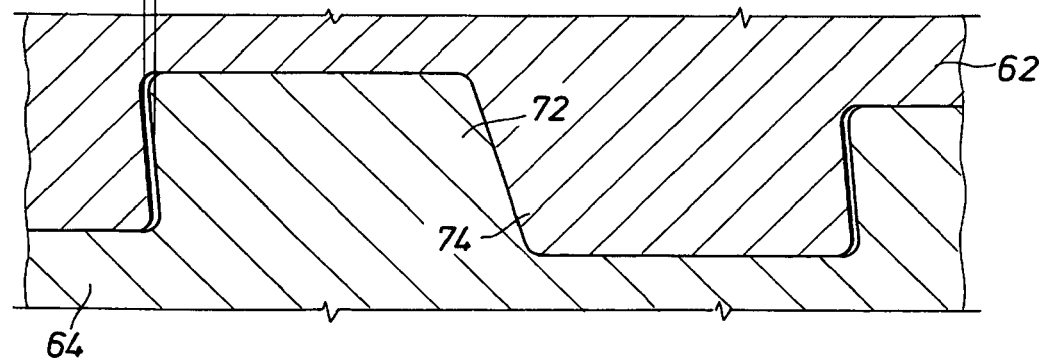
FIG. 8 is an enlarged sectional view illustrating the maximum dimensional clearance permitted between the load flanks of the threads of the present invention during compressive loading.

FIG. 8 illustrates the connection of the present invention when the connection is being subjected to a compressive load. Under this condition, a gap 90 is formed between the load flanks of the engaged threads. In a preferred form of the invention, the gap 90 is limited to an axial distance of 0.0030 in.

From a consideration of FIGS. 7 and 8, it will be appreciated that the micro-movement associated with transitions in stress applications between tension and compression loadings limits micro-movement axially in an amount defined by the axial dimensional differences between the pin threads and the axial distance between adjacent threads in the coupling. No radial separation of the sealing surfaces occurs between root and crest of the engaged threads during the application of compressive and tension forces to the connection. With sufficient preload, no separation will occur between load flanks during tension loading. Micro-movements between the root and crest engagements are thus limited to axial displacements resulting from changes in axial loading, which have a minimal effect on the sealing effectiveness of the engaged surfaces of a connection of the present invention.

Figure 9:
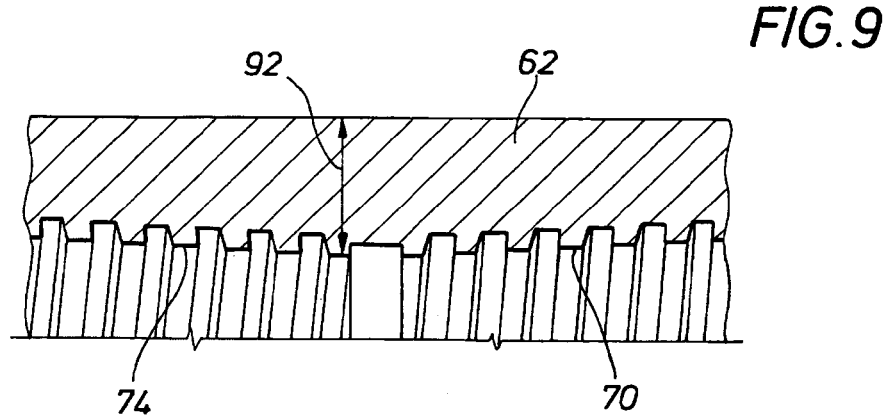
FIG. 9 is an enlarged sectional view illustrating details of construction at the center of the coupling of the present invention.

FIG. 9 illustrates a full wall thickness central area of the wall of the coupling 62 of the present invention. A radial dimension 92 illustrates the maximum dimension of the coupling wall. In a preferred design of the present invention, the dimension 92 is substantially equal to the nominal wall thickness of conventional coupling stock, preferably that for buttress connectors.

Figure 10:
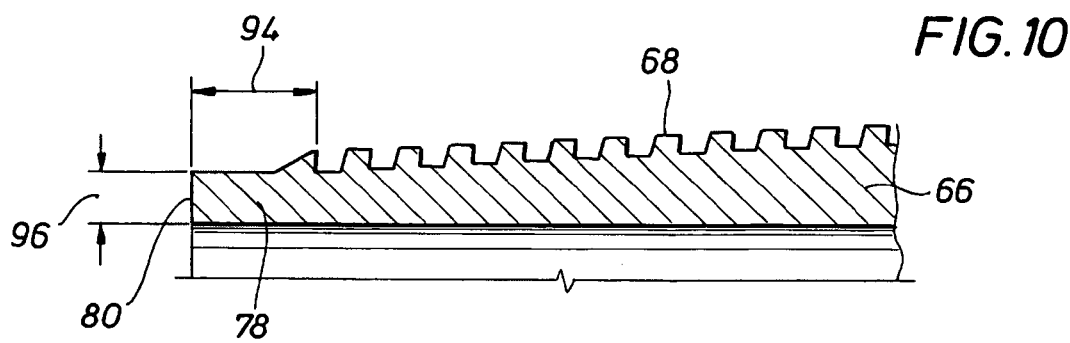
FIG. 10 is an enlarged sectional view illustrating details of construction at the pin nose portion of the present invention.

FIG. 10, illustrates details in the pin nose 78 of the pin 66 of the present invention. The axial length of the pin nose 78 is defined by a dimension 94. The pin nose length dimension 94 is the axial length between the pin nose face 80 and the termination of threads at the end of the pin 66. The precise point of the thread termination is that at which there is no mechanical engagement between the pin threads and the coupling threads when the pin is made-up into the coupling to the final make-up torque. The wall thickness of the annular pin nose is defined by a dimension 96. The torque shoulder area of the pin nose shoulder is defined by the annular surface 80 forming the pin nose face.

Figure 11:
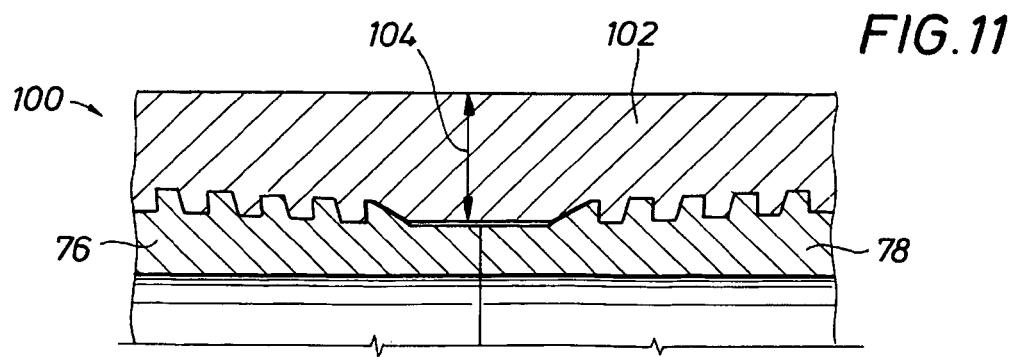
FIG. 11 is an enlarged sectional view illustrating details in a modified form of the present invention.

FIG. 11 illustrates details in a modified form of the present invention, indicated generally at 100. The connection 100 is similar to the connection 60 previously illustrated with the exception that the center of the coupling is devoid of threads. The maximum radial thickness of the coupling 102, indicated at 104, is equal to the nominal wall thickness of conventional API coupling stock. The threads in the coupling 100 run out to the smooth cylindrical surface at the center of the coupling stock. The pin nose areas of the pins 76 and 78 remain free of engagement with the surrounding coupling to permit preloading the pin noses without directly transferring the preload forces to the overlapping coupling structure.

While the forgoing specification, drawings and the following claims are considered to be illustrative of the manner of making and using the present invention, it will be appreciated that various modifications to the methods and connections of the invention may be made without departing from the spirit and scope of the invention. Thus, by way of example rather than limitation, the threads of the connection may be dovetail or double hook or wedge threads rather than the negative load flank threads specifically described. Similarly, various other thread forms may be used with less than all of the individual features or advantages described for the connections and methods of the present invention. Accordingly, it will be understood that the present invention is intended to be limited only by the definitions of the following claims.

The invention claimed is:

1. A threaded pipe connection, comprising:
  a coupling body constructed of standard coupling stock and having internally formed coupling threads,
  first and second pins formed at the ends, respectively, of first and second tubular pipe joints,
  first and second pin threads formed, respectively, along the external surfaces of said first and second pins, said first and second pin threads adapted to mate with said coupling threads to form a structurally joining connection and pressure seal between said first and second pins and said coupling,
  said first and second pins having first and second annular pin faces, respectively, formed along the axial end surfaces of the axial ends of said pins, each said pin face having a radial thickness defined between the internal diameter and the external diameter of the tubular pin on which it is formed, said first and second pin faces being adapted to engage each other at the approximate axial midpoint of said coupling when said first and second pins are fully mated with said coupling, said coupling being free of any torque shoulders for engagement by said first and second pins,
  first and second pin noses formed on said first and second pins, respectively, extending axially away from their respective pin faces by first and second pin nose lengths, respectively, the axial length of each of said pin noses being equal to at least 80% of the axial length traversed by two turns of the threads on the respective pins on which they are formed, said pin noses being at least partially structurally unconnected with said internal coupling threads when said first and second pins are fully mated with said coupling whereby axial forces in said coupling at radial locations adjacent either of said pin noses are not directly transmitted between said coupling and said pin noses, and
  a negative load flank thread geometry in threads of said first and second pins and the mating coupling threads, whereby radially compressive forces are imposed between said first and second pins and said coupling following engagement of said pin nose faces during torque application in the make-up of said connection.

2. A threaded pipe connection as defined in claim 1, wherein said standard coupling stock is for a buttress thread connection.

3. A threaded pipe connection as defined in claim 1 wherein said pin noses are formed by reducing the outside diameter of their respective pins.

4. A threaded pipe connection as defined in claim 1 wherein each said pin nose length is substantially equal to the axial advance of two thread turns on its associated pin.

5. A threaded pipe connection as defined in claim 1 wherein said first and second pin noses each have a ratio R of a pin nose axial length to an associated torque shoulder area that falls within the range $$0.025 \leq R \leq 0.35.$$

6. A threaded pipe connection as defined in claim 1 wherein said coupling has threads formed along its internal central area.

7. A threaded pipe connection as defined in claim 1 wherein said coupling has an area devoid of threads along its internal central area.

8. A threaded pipe connection as defined in claim 1 wherein the root crest clearance between engaged pin and coupling threads is 0.0 in.

9. A threaded pipe connection as defined in claim 1 wherein the axially measured thread widths of threads on said first pin are less than the axially measured distance between adjacent coupling threads by approximately 0.003 in.

10. A threaded pipe connection as defined in claim 9 wherein at final torque of said connection, stab flanks existing between engaged pin and box threads are separated by approximately 0.003 in. measured axially.

11. A threaded pipe connection, comprising:
a coupling body having internally formed coupling threads,
first and second pins formed at the ends, respectively, of first and second tubular pipe joints,
first and second pin threads formed, respectively, along the external surfaces of said first and second pins, said first and second pin threads adapted to mate with said coupling threads to form a structurally joined connection and pressure seal between said first and second pins and said coupling,
first and second annular pin nose faces formed along the axial end surfaces of the axial ends of said first and second pins, respectively, each said pin face having a radial thickness defined between the internal diameter and the external diameter of the tubular pin on which it is formed, said first and second pin faces being substantially planar and adapted to engage each other at the approximate axial midpoint of said coupling when said first and second pins are fully mated with said coupling,
first and second pin noses formed on said first and second pins,
said pin noses having first and second pin nose lengths, respectively, wherein each said pin nose length is substantially equal to the axial advance of two thread turns on its associated pin, and being at least partially structurally unconnected with said internal coupling threads when said first and second pins are fully mated with said coupling whereby axial forces in said coupling at radial locations adjacent either of said pin noses are not directly transmitted between said coupling and said pin noses, and
said coupling having a central area between axial ends of said coupling with a wall thickness substantially equal to the wall thickness of standard coupling stock for the pipe carrying said pins.

12. A threaded pipe connection, comprising:
a coupling body having internally formed coupling threads,
first and second pins formed at the ends, respectively, of first and second tubular pipe joints,
first and second pin threads formed, respectively, along the external surfaces of said first and second pins, said first and second pin threads adapted to mate with said coupling threads to form a structurally joined connection and pressure seal between said first and second pins and said coupling,
first and second annular pin nose faces formed along the axial end surfaces of the axial ends of said first and second pins, respectively, each said pin face having a radial thickness defined between the internal diameter and the external diameter of the tubular pin on which it is formed, said first and second pin faces being substantially planar and adapted to engage each other at the approximate axial midpoint of said coupling when said first and second pins are fully mated with said coupling,
first and second pin noses formed on said first and second pins,
said pin noses having first and second pin nose lengths, respectively, the axial length of each of said pin noses being equal to at least 80% of the axial length traversed by two turns of the threads on the respective pins on which they are formed, and being at least partially structurally unconnected with said internal coupling threads when said first and second pins are fully mated with said coupling whereby axial forces in said coupling at radial locations adjacent either of said pin noses are not directly transmitted between said coupling and said pin noses, and
said coupling having a central area between axial ends of said coupling with a wall thickness substantially equal to the wall thickness of standard coupling stock for the pipe carrying said pins, said coupling having threads formed along said central area.

13. A threaded pipe connection, comprising:
a coupling body having internally formed coupling threads,
first and second pins formed at the ends, respectively, of first and second tubular pipe joints,
first and second pin threads formed, respectively, along the external surfaces of said first and second pins, said first and second pin threads adapted to mate with said coupling threads to form a structurally joined connection and pressure seal between said first and second pins and said coupling, wherein the axially measured thread widths of threads on said first pin are less than the axial spacing between adjacent threads in said coupling by approximately 0.003 in,
first and second annular pin nose faces formed along the axial end surfaces of the axial ends of said first and second pins, respectively, each said pin face having a radial thickness defined between the internal diameter and the external diameter of the tubular pin on which it is formed, said first and second pin faces being substantially planar and adapted to engage each other at the approximate axial midpoint of said coupling when said first and second pins are fully mated with said coupling,
first and second pin noses formed on said first and second pins,
said pin noses having first and second pin nose lengths, respectively, the axial length of each of said pin noses being equal to at least 80% of the axial length traversed by two turns of the threads on the respective pins on which they are formed, and being at least partially structurally unconnected with said internal coupling threads when said first and second pins are fully mated with said coupling whereby axial forces in said coupling at radial locations adjacent either of said pin noses are not directly transmitted between said coupling and said pin noses, and said coupling having a central area between axial ends of said coupling with a wall thickness substantially equal to the wall thickness of standard coupling stock for the pipe carrying said pins.

14. A threaded pipe connection, comprising:

a coupling body having internally formed coupling threads, first and second pins formed at the ends, respectively, of first and second tubular pipe joints, first and second pin threads formed, respectively, along the external surfaces of said first and second pins, said first and second pin threads adapted to mate with said coupling threads to form a structurally joined connection and pressure seal between said first and second pins and said coupling, first and second annular pin nose faces formed along the axial end surfaces of the axial ends of said first and second pins, respectively, each said pin face having a radial thickness defined between the internal diameter and the external diameter of the tubular pin on which it is formed, said first and second pin faces being substantially planar and adapted to engage each other at the approximate axial midpoint of said coupling when said first and second pins are fully mated with said coupling, first and second pin noses formed on said first and second pins, said pin noses having first and second pin nose lengths, respectively, the axial length of each of said pin noses being equal to at least 80% of the axial length traversed by two turns of the threads on the respective pins on which they are formed, and being at least partially structurally unconnected with said internal coupling threads when said first and second pins are fully mated with said coupling whereby axial forces in said coupling at radial locations adjacent either of said pin noses are not directly transmitted between said coupling and said pin noses, and said coupling having a central area between axial ends of said coupling with a wall thickness substantially equal to the wall thickness of standard coupling stock for the pipe carrying said pins, wherein at final torque of said connection, stab flanks existing between engaged pin and box threads are separated by approximately 0.003 in. measured axially.

15. A threaded pipe connection, comprising:

a coupling body constructed of standard coupling stock and having internally formed coupling threads, first and second pins formed at the ends, respectively, of first and second tubular pipe joints, first and second pin threads formed, respectively, along the external surfaces of said first and second pins, said first and second pin threads adapted to mate with said coupling threads to form a structurally joining connection and pressure seal between said first and second pins and said coupling, said first and second pins having first and second annular pin faces, respectively, formed along the axial end surfaces of the axial ends of said pins, each said pin face having a radial thickness defined between the internal diameter and the external diameter of the tubular pin on which it is formed, said first and second pin faces being adapted to engage each other at the approximate axial midpoint of said coupling when said first and second pins are fully mated with said coupling, said coupling being free of any torque shoulders for engagement by said first and second pins, first and second pin noses formed on said first and second pins, respectively, extending axially away from their respective pin faces by first and second pin nose lengths, respectively, the axial length of said first pin nose being equal to the axial advance of two thread turns of the threads on said first pin, said pin noses being at least partially structurally unconnected with said internal coupling threads when said first and second pins are fully mated with said coupling whereby axial forces in said coupling at radial locations adjacent either of said pin noses are not directly transmitted between said coupling and said pin noses, and a negative load flank thread geometry in threads of said first and second pins and the mating coupling threads, whereby radially compressive forces are imposed between said first and second pins and said coupling following engagement of said pin nose faces during torque application in the make-up of said connection.

16. A threaded pipe connection, comprising:

a coupling body having internally formed coupling threads, first and second pins formed at the ends, respectively, of first and second tubular pipe joints, first and second pin threads formed along the external surfaces of said first and second pins, respectively, said first and second pin threads adapted to mate with said coupling threads to form a structurally joining connection and a high pressure seal between said pins and said coupling, said first and second pins having first and second annular pin nose faces formed along the axial end surfaces of the axial ends of each of said first and second pins, respectively, each said first and second pin faces having a radial thickness defined between the internal diameter and the external diameter of the tubular pin on which it is formed, said first and second pin faces being adapted to engage each other at the approximate axial midpoint of said coupling when said first and second pins are fully mated with said coupling, first and second pin noses formed on said first and second pins, respectively, extending axially away from their respective pin faces by first and second pin nose lengths, respectively, said first and second pin noses being at least partially structurally unconnected with said internal coupling threads when said first and second pins are fully mated with said coupling whereby axial forces in said coupling at radial locations adjacent said first and second pin noses are not directly transmitted between said coupling and said first and second pin noses, said coupling being free of any torque shoulders for engagement by said first and second pins, wherein a negative load flank thread geometry is provided in said pin and coupling threads for imposing radially compressive forces between said pins and said coupling following engagement of said first and second pin nose faces during torque application in the make-up of said connection, and wherein a ratio R of said first pin nose length to the torque shoulder area of said first pin-nose face of said first pin falls within the range $0.025 \leq R \leq 0.35$.

* * * * *